United States Patent
Ishiwa et al.

(10) Patent No.: US 6,513,936 B1
(45) Date of Patent: Feb. 4, 2003

(54) PROJECTOR

(75) Inventors: Masaru Ishiwa, Kawasaki (JP); Keiji Hayashi, Kawasaki (JP); Toshihiro Suzuki, Kawasaki (JP); Tetsuya Kobayashi, Kawasaki (JP); Tetsuya Hamada, Kawasaki (JP); Takeshi Gotoh, Kawasaki (JP); Mari Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/612,668

(22) Filed: Jul. 10, 2000

(30) Foreign Application Priority Data

Sep. 16, 1999  (JP) ............................................ 11-262005

(51) Int. Cl.[7] ........................ G03B 21/18; G03B 21/26; G03B 21/16; G03B 21/14; G03B 21/22

(52) U.S. Cl. .............................. 353/56; 353/55; 353/58; 353/60; 353/61; 353/119

(58) Field of Search .............................. 353/55, 56, 57, 353/58, 60, 61, 119, 52

(56) References Cited

U.S. PATENT DOCUMENTS

| | | | | |
|---|---|---|---|---|
| 5,313,234 A | * | 5/1994 | Edmonson et al. | 353/61 |
| 5,876,105 A | * | 3/1999 | Rodriguez, Jr. | 353/119 |
| 5,892,561 A | * | 4/1999 | Suzuki et al. | 349/122 |
| 5,951,137 A | * | 9/1999 | Bortz | 353/96 |
| 6,227,671 B1 | * | 5/2001 | Haba | 353/31 |

* cited by examiner

*Primary Examiner*—Russell Adams
*Assistant Examiner*—Magda Cruz
(74) *Attorney, Agent, or Firm*—Greer, Burns & Crain, Ltd.

(57) ABSTRACT

A projector includes a first housing, a second housing, and a sound insulating member. The first housing is provided with first heat-generating elements used for generating an image, first fans producing cooling airflows towards each one of the first heat-generating elements, and vents via which the cooling airflows heated by the first heat-generating elements are discharged. The second housing encloses the first housing, and has second fans discharging the cooling airflows outside the projector. The sound insulating member is provided on a path between the vents and the second fans so as to insulate sound produced by the first fans. The projector may be provided with a dust-proof member for the projecting lens.

8 Claims, 12 Drawing Sheets

FIG. 4
PRIOR ART

| | NUMBER OF FANS | TYPE | APPLIED VOLTAGE | NOISE VALUE |
|---|---|---|---|---|
| AIR INTAKE FAN | 3 | 96mm SQUARE SIROCCO FAN | 10 V | 40.0 dB |
| AIR DISCHARGE FAN | 1 | 120mm SQUARE AXIAL FLOW FAN | 8.8 V | 41.8 dB |
| INTERNAL COOLING FAN | 3 {1, 2} | 50mm SQUARE SIROCCO FAN / 50mm SQUARE AXIAL FLOW FAN | } 12 V | 39.5 dB |
| TOTAL | 7 | | | 46.1 dB |

FIG. 8

| | NUMBER OF FANS | TYPE | APPLIED VOLTAGE | NOISE VALUE |
|---|---|---|---|---|
| AIR INTAKE FAN | 3 | 96mm SQUARE SIROCCO FAN | 10 V | 38.6 dB |
| AIR DISCHARGE FAN | 1 | 120mm SQUARE AXIAL FLOW FAN | 8.8 V | 41.8 dB |
| INTERNAL COOLING FAN | 3 {1, 2} | 50mm SQUARE SIROCCO FAN / 50mm SQUARE AXIAL FLOW FAN | 12 V | 39.5 dB |
| TOTAL | 7 | | | 44.7 dB |

F I G. 11

|  | NUMBER OF FANS | TYPE | APPLIED VOLTAGE | NOISE VALUE |
|---|---|---|---|---|
| AIR INTAKE FAN | 3 | 96mm SQUARE SIROCCO FAN | 10 V | 40.6 dB |
| AIR DISCHARGE FAN | 1 | 120mm SQUARE AXIAL FLOW FAN | 8.8 V | 41.8 dB |
| INTERNAL COOLING FAN | 3 {1, 2} | 50mm SQUARE SIROCCO FAN / 50mm SQUARE AXIAL FLOW FAN | }12 V | 39.5 dB |
| TOTAL | 7 |  |  | 46.7 dB |

F I G. 1 2

| | NUMBER OF FANS | TYPE | APPLIED VOLTAGE | NOISE VALUE |
|---|---|---|---|---|
| AIR INTAKE FAN | 3 | 96mm SQUARE SIROCCO FAN | 10 V | 39.0 dB |
| AIR DISCHARGE FAN | 1 | 120mm SQUARE AXIAL FLOW FAN | 8.8 V | 41.8 dB |
| INTERNAL COOLING FAN | 3 {1, 2} | 50mm SQUARE SIROCCO FAN / 50mm SQUARE AXIAL FLOW FAN | }12 V | 39.5 dB |
| TOTAL | 7 | | | 44.5 dB |

PROJECTOR

BACKGROUND OF THE INVENTION

1. Field of the Invention

The present invention generally relates to a projector having heat-generating elements such as polarizing plates and liquid crystal panels, and particularly relates to a projector provided with cooling mechanisms for cooling the heat-generating elements.

A projector, such as a liquid crystal projector, is provided with an optical system including elements such as a folding mirror, color separating dichroic mirrors, liquid crystal panels, color composition mirrors (prism). Since the liquid crystal panels and polarizing plates provided adjacent to the liquid crystal panels absorb light and generate heat, it is necessary to cool the liquid crystal panels and the polarizing plates. Therefore, there is a need for efficiently cooling the liquid crystal panels and the polarizing plates.

Also, the projector is commonly used for meetings and presentations in an office or may be used as a home image output device (a screen for television and games). Therefore, there is a need for reducing the noise generated by the projector.

Further, since the projector is provided with a fine optical system as described above, in order to improve the quality of the projected image and to improve the reliability of the projector itself, it is necessary to prevent dust from entering the projector.

2. Description of the Related Art

Referring to FIGS. 1 and 2, a projector 10 of the related art will be described to facilitate the understanding of the projector of the present invention. FIG. 1 is a transverse cross section of the projector 10 and FIG. 2 is an enlarged diagram showing a portion of the projector of the related art provided with air intake fans 29 to 31.

As shown in FIG. 1, the projector 10 includes an inner housing 11, an outer housing 12, a light source 13, liquid crystal panel units 24 to 26, a projecting lens 27, the air intake fans 29 to 31 and an air discharge fan 32.

The inner housing 11 is provided inside the outer housing 12, and a space 28 is formed between the inner housing 11 and the outer housing 12. The inner housing 11 surrounds an optical system including elements such as total reflection mirrors 14 to 16, color separation dichroic mirrors 17 and 18, color composition dichroic mirrors 19 and 20, condenser lens 21 to 23, and the liquid crystal panel units 24 to 26.

The projector 10 having the above-described optical system generates images in the following manner. When passing through the optical system, light emitted from the light source 13 is separated into beams of, for example, three fundamental colors by means of the color separation dichroic mirrors 17 and 18. Then, the separated beams are directed through the liquid crystal panel units 24 to 26 so as to be subjected to an image signal superimposing process for each color. This image signal superimposing process may also be referred to as an image modulation process.

Then, the beams are color composited through the color composition dichroic mirrors 19 and 20. The beams are then projected through the projecting lens 27 towards a screen (not shown).

The above-described liquid crystal panel units 24 to 26 each includes a liquid crystal panel and a pair of polarizing plates provided on either sides of the liquid crystal panel. The liquid crystal panel and the polarizing plates absorb light and generate heat. Since polarizing film made of organic material is normally used as the polarizing plates, the liquid crystal panel units 24 to 26 will be degraded when heated to a temperature exceeding 70° C.

In order to prevent the liquid crystal panel units 24 to 26 from being overheated, the air intake fans 29 to 31 are provided on a lower surface of the inner housing 11 at a position opposing the liquid crystal panel units 24 to 26. The air intake fans 29 to 31 generate cooling airflows which are directed to polarizing plates of the liquid crystal panel units 24 to 26. Thus, each of the polarizing plates is air-cooled.

The temperature of the cooling airflows is raised when passing by the polarizing plates of the liquid crystal panel units 24 to 26. Thus-heated airflows are discharged into the outer housing 12 through vents 33, 34, 35 provided in a top plate of the inner housing 11. Further, the heated airflows are discharged outside the apparatus through external vent 36 by means of the discharge fan 32.

The space 28 also includes various devices 39a other than the inner housing 11. There are some devices 39a which may generate heat. The light source 13 also generates heat. In order to cool the heat-generating devices 39a and the light source 13, the projector 10 is provided with internal cooling fans 39 for each of the devices 39a and the light source 13.

In the FIG. 2, three air intake fans 29 to 31 are provided to correspond to the number of liquid crystal panel units 24 to 26 provided in the projector 10. However, as illustrated in FIG. 3, the liquid crystal panel units 24 to 26 may be cooled by a single air intake fan 37 via an air-conducting duct 38.

Thus, the degradation of the polarizing plates and the liquid crystal panels due to heat can be prevented by means of the air intake fans 29 to 31 provided at positions opposing the liquid crystal panel units 24 to 26. Thus, the reliability of the projector 10 is improved.

However, since each of the air intake fans 29 to 31 generates cooling airflows by rotating its blades, there is a drawback that whistling sounds are generated when the blades of the fans cut through the air. These whistling sounds give rise to a noise during operation of the projector 10. With the structure illustrated in FIG. 2, since each fan 29 to 31 generates whistling sounds, the noise is increased. With the structure illustrate in FIG. 3, although there is only one air intake fan 37, the noise is increased since the air-conducting plates cut through the air flowing within the air-conducting duct 38.

Thus generated noise passes through the inner housing 11 and is transferred to the space 28 between the inner housing 11 and the outer housing 12 via the vents 33 to 35 formed in the inner housing 11. Then, the noise is reflected of f the walls of the outer housing 12 and is transferred to the external vent 36. Finally, the noise propagates outside the projector 10 through the external vent 36.

FIG. 4 is a diagram showing a chart of noise values generated in the projector 10 of the related art. The chart includes columns indicating name, number, type, applied voltage, and noise value of each fan provided in the projector 10. The noise value represents a value measured using a measuring device provided at the external vent 36.

As can be seen from FIG. 4, when only three air intake fans 29 to 31 were driven, the noise value was 40.0 dB. When only the air discharge fan 32 was driven, the noise value was 41.8 dB. When only three internal cooling fans 39 were driven, the noise value was 39.5 dB.

Also, when all the fans, that is to say, the air intake fans 29 to 31, the air discharge fan 32 and the internal cooling fans 39 were driven, the noise value amounted to 46.1 dB. Accordingly, the projector 10 of the related art has a drawback that a large noise is produced.

SUMMARY OF THE INVENTION

Accordingly, it is a general object of the present invention to provide a projector which can obviate the drawbacks described above.

It is another and more specific object of the present invention to provide a projector which can positively implement the cooling process while reducing the noise propagating out therefrom.

In order to achieve the above objects according to the present invention, a projector includes:

- a first housing provided with first heat-generating elements used for generating an image, first fans producing cooling airflows towards each one of the first heat-generating elements and vents via which the cooling airflows heated by the first heat-generating elements are discharged;
- a second housing in which the first housing is installed, the second housing being provided with second fans discharging the cooling airflows outside the projector; and
- a sound insulating member provided on a path between the vents and the second fans so as to insulate sounds produced by the first fans.

With the projector described above, a noise is prevented from propagating outside the projector through openings provided with the second fans.

Other objects and further features of the present invention will be apparent from the following detailed description when read in conjunction with the accompanying drawings.

BRIEF DESCRIPTION OF THE DRAWINGS

FIG. 4 is a diagram showing a chart of noise values generated in the projector 10 of the related art.

FIG. 8 is a diagram showing a chart of noise values generated in the projector 40A of a first embodiment of the present invention.

FIG. 11 is a diagram showing a chart of noise values generated in the projector having a structure similar to the projector of a second embodiment of the resent invention but without the sound insulating board.

FIG. 12 is a diagram showing a chart of noise values generated in the projector of a second embodiment of the present invention.

DETAILED DESCRIPTION OF THE PREFERRED EMBODIMENTS

In the following, principles and embodiments of the present invention will be described with reference to the accompanying drawings.

Figure 1:
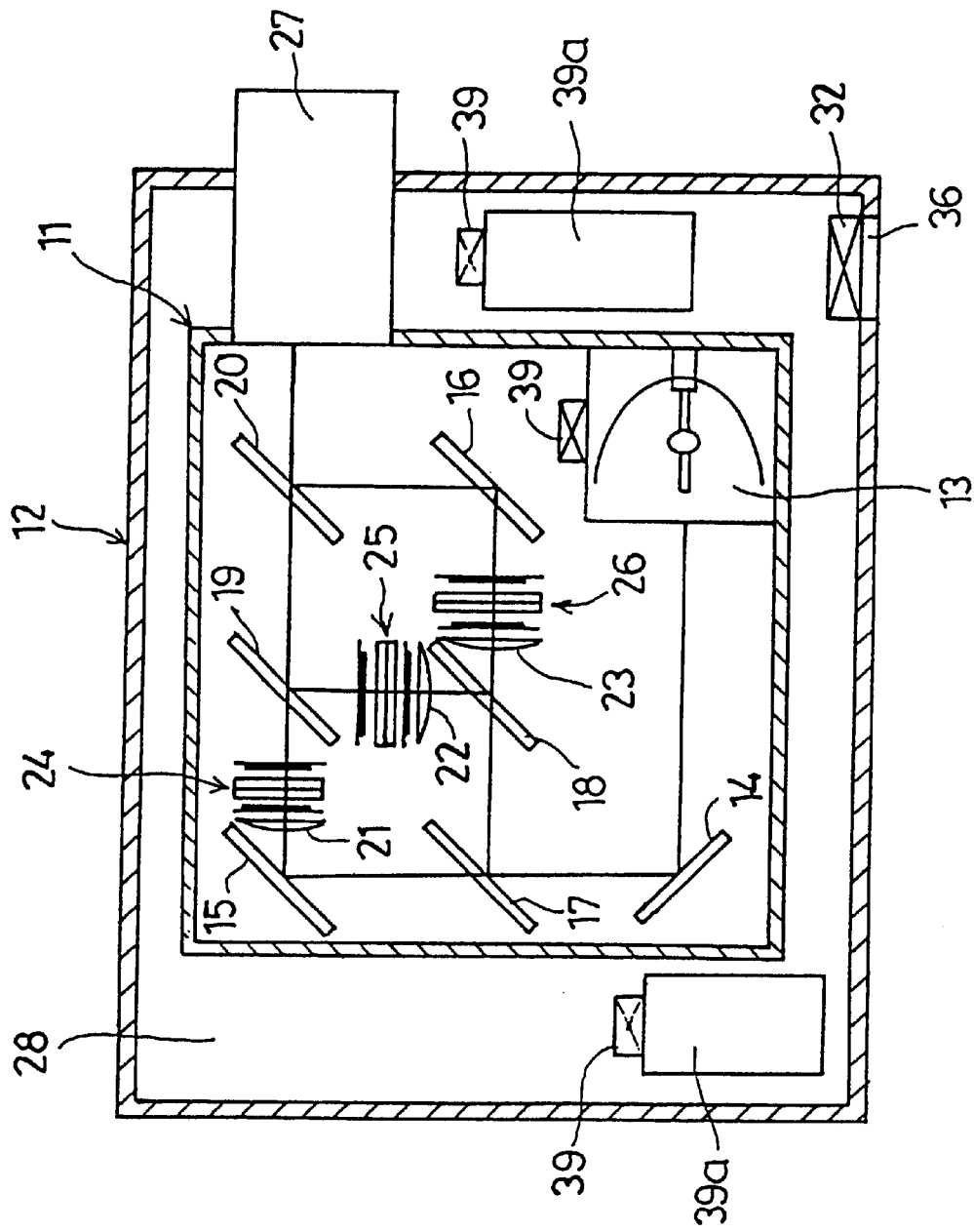
FIG. 1 is a diagram showing transverse cross section of a projector of the related art.
Figure 2:
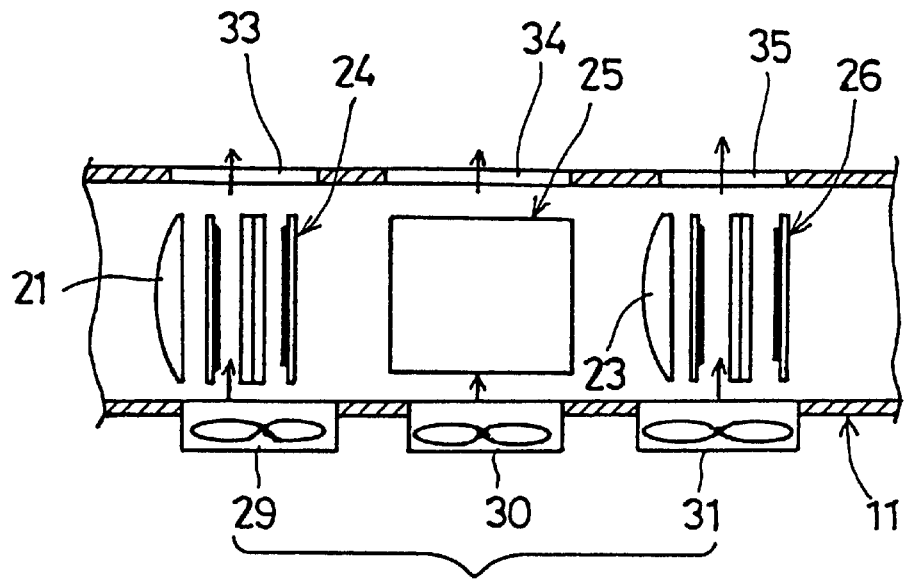
FIG. 2 is an enlarged view showing a portion of the projector of the related art provided with air intake fans.
Figure 3:
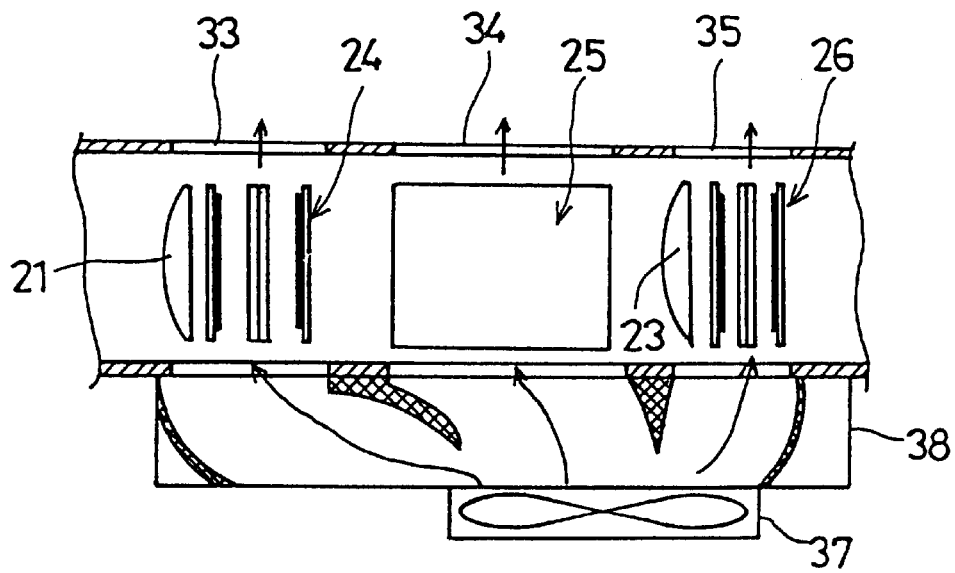
FIG. 3 is an enlarged view showing a portion of the projector of the related art provided with a single air intake fan.
Figure 5:
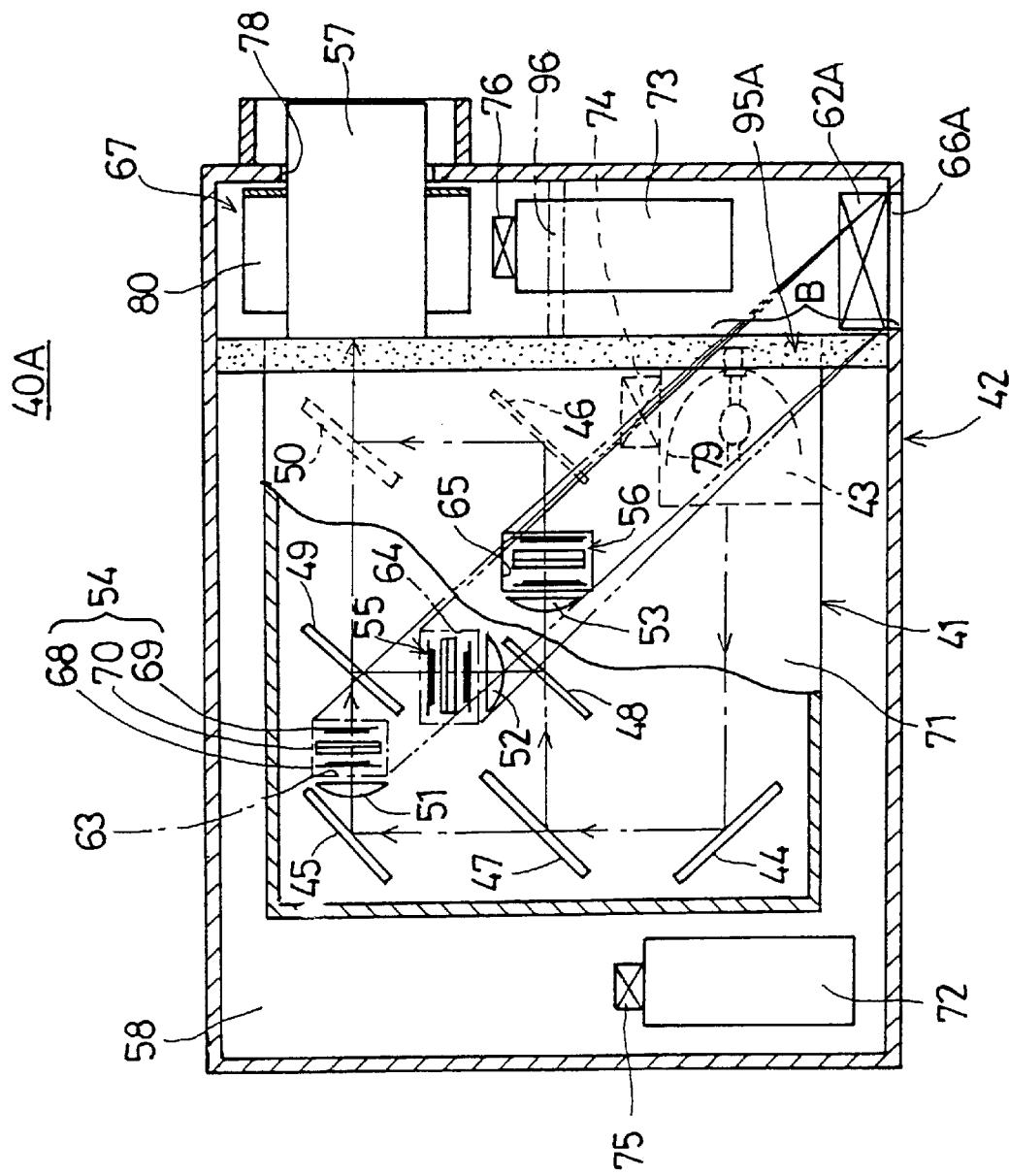
FIG. 5 is a diagram showing a transverse cross section of a projector of a first embodiment of the present invention.
Figure 6:
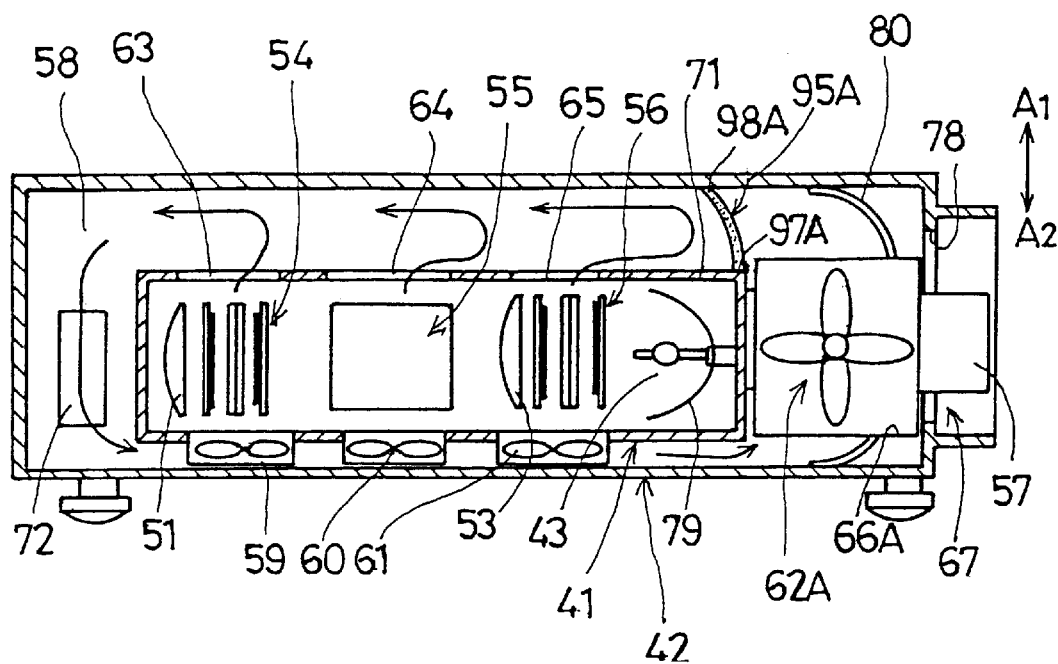
FIG. 6 is a diagram showing a vertical cross section of the projector of the first embodiment of the present invention.

As shown in FIGS. 5 and 6, the projector 40A includes an inner housing 41, an outer housing 42, a light source 43, liquid crystal panel units 54 to 56, a projecting lens 57, the air intake fans 59 to 61, an air discharge fan 62A, a dust-proof mechanism 67 and a sound insulating board 95A.

The inner housing 41 is provided inside the outer housing 42. Since the size of the inner housing 41 is smaller than the size of the outer housing 42, a space 58 is formed between the inner housing 41 and the outer housing 42. The inner housing 41 surrounds an optical system including elements such as a light source 43, mirrors 44 to 46, color separation dichroic mirrors 47 and 48, color composition dichroic mirrors 49 and 50, condenser lens 51 to 53, liquid crystal panel units 54 to 56 and a projecting lens 57.

The light source 43 is, for example, a metal halide lamp emitting parallel beams in a single direction by means of the reflector 79. The light source 43 is connected to a power supply unit 72 that supplies power to the light source 43. In order to emit a fixed amount of light, the light source 43 is under control of a lamp stabilizer 73. The power supply unit 72 and the lamp stabilizer 73 are provided in the space 58 between the inner housing 41 and the outer housing 42.

It is to be noted that heat is generated at each one of the light source 43, the power supply unit 72 and the lamp stabilizer 73. For cooling purpose, the light source 43 is provided with an internal cooling fan 74, the power supply unit 72 with an internal cooling fan 75 and the lamp stabilizer 73 with an internal cooling fan 76. The internal cooling fans 74 to 76 may include two axial flow fans having a size of 50 mm square and an applied voltage of 12V and one sirocco fan having a size of 50 mm square and an applied voltage of 12V.

The mirrors 44 to 46 are provided at positions illustrated in FIG. 5, so that the direction of an incident beam is changed through 90°. The light emitted from the light source 43 passes through the color separation dichroic mirrors 47, 48 and is separate into three fundamental colors (R, G, B) having different frequency bands. Thus, each liquid crystal panel unit 54 to 56 receives beams of different colors (R, G, B) collected by the condensing lens 51 to 53.

The above-described liquid crystal panel units 54 to 56 each includes a liquid crystal panel 70 and a pair of polarizing plates 68, 69 provided on either side of the liquid crystal panel 70. Each of the liquid crystal panels 70 of the liquid crystal panel units 54 to 56 receives image signals supplied from an image processing circuit (not shown). The liquid crystal panel 70 operates according to the image signal and superimposes image information for each of the color separated fundamental colors.

The color composition dichroic mirrors 49, 50 composing each fundamental color having image signals superimposed at the crystal panel units 54 to 56. Thus, a color image is produced. The color image is projected through the projecting lens 57 towards a screen (not shown).

The liquid crystal panel 70 and the polarizing plates 68, 69 absorb light and generate heat. Since polarizing film made of organic material is normally used as the polarizing plates 68, 69, the liquid crystal panel units 54 to 56 will be degraded when it is heated to a temperature exceeding 70° C. Thus, there is a need for cooling the liquid crystal panel units 54 to 56.

As shown in FIG. 6, in order to prevent the liquid crystal panel units 54 to 56 from being overheated, the air intake fans 59 to 61 are provided on a lower surface of the inner housing 41 at a position opposing the liquid crystal panel units 54 to 56. The air intake fans 59 to 61 generate cooling airflows which are directed to polarizing plates 68, 69 of the liquid crystal panel units 54 to 56.

The temperature of the cooling airflows is raised when passing by the liquid crystal panel units 54 to 56. Thus-heated airflows are discharged into the outer housing 42 through vents 63, 64, 65 provided in a top plate 71 of the inner housing 41. Further, the heated airflows are discharged outside the apparatus through external vent 66A by means of the discharge fan 62A provided in the outer housing 42.

Now, noise generated at the projector 40A will be described in detail. Since each of the air intake fans 59 to 61, the air discharge fan 62A and the internal cooling fans 74 to 76 generates cooling airflows by rotating its blades, there is a drawback that whistling sounds are generated when the blades of the fans cut through the air. These whistling sounds give rise to a noise during operation of the projector 40A.

Thus generated noise passes through the inner housing 41 and travels to the space 58 between the inner housing 41 and the outer housing 42 via the vents 63 to 65 formed in the inner housing 41. Then, the noise leaks outside the projector 40A through the external vent 66A. A result obtained from the noise measurement of the projector 40A shows that the noise was at its maximum at the front of the air discharge fan 62A, or at the external vent 66A.

The noise generated by each of the air intake fans 59 to 61 was measured to determine its propagation paths. The noise due to the air intake fans 59 to 61 starts from the vents 63 to 65 to the space 58. It was then found that the noise travels in a first propagation path directly leading to the external vent 66A or a second propagation path in which the noise is reflected at various positions within the space 58.

The noise travelling in the second propagation path does not have any great influence on a noise leaking outside the device (hereinafter referred to as an external leaking noise) attenuated by being reflected. On the contrary, the noise travelling in the first propagation path has a great influence on the external leaking noise since there is no attenuation of the noise travelling in the first propagation path.

Thus, in the present embodiment, the sound insulating board 95A is provided in the first propagation paths (shown by a dash-dot-line in FIG. 5) directly extending from the vents 63 to 65 to the external vent 66A. In detail, in the present embodiment, the sound insulating board 95A is provided so as to traverse straight lines extending from each of the vents 63 to 65 to the external vent 66A. For the sake of clarity, the sound insulating board 95A is shown as a dotted area.

The sound insulating board 95A is provided on the top plate 71 of the inner housing 41 at a position along the side of the top plate 71 which is closer to the projecting lens 57. The width (in FIG. 5, the length in a vertical direction) of the sound insulating board 95A is approximately equal to the width of the outer housing 42. Accordingly, the width of the sound insulating board 95A is greater than the width of the inner housing 41.

The sound insulating board 95A has a lower edge 97A connected to the top plate 71 of the inner housing 41 and an upper edge 98A connected to the inner wall of the outer housing 42. Thus, the space 58 between the inner housing 41 and the outer housing 42 is defined by the sound insulating board 95A.

With the structure described above, the noise will no longer travel along the first propagation path (dash-dot lines shown in FIG. 5) since it is reflected by the sound insulating board 95A. The noise reflected off at the sound insulating board 95A is further reflected at various positions within the space 58 and travels towards the external vent 66A. Thus, the noise is attenuated through reflections within the space 58. Accordingly, the external leaking noise of the projector 40A is reduced.

FIG. 8 is a diagram showing a chart of noise values generated in the projector 40A of a first embodiment of the present invention. The chart shown in FIG. 8 is similar to the chart shown in FIG. 4 concerning the measured items and a method of measurement.

As shown in FIG. 8, with the projector 40A of the present embodiment, when only three air intake fans 59 to 61 were driven, the noise value was 38.6 dB. When only the air discharge fan 62A was driven, the noise value was 41.8 dB. When only three internal cooling fans 74 to 76 were driven, the noise value was 39.5 dB. When all the fans, i.e., the air intake fans 59 to 61, the air discharge fan 62A and the internal cooling fans 74 to 76, were driven, the noise value (hereinafter referred to as external leaking noise value) was 44.7 dB.

By comparing the measurements of the projector 40A of the present invention (FIG. 8) and the measurements of the projector 10 of the related art (FIG. 4), it can be seen that the noise value generated at the air intake fans 59 to 61 is significantly reduced (from 40.0 dB to 38.6 dB) by providing the sound insulating plate 95A. Accordingly, the external leaking noise value is also significantly reduced from 46.1dB to 44.7 dB. Therefore, it can also be seen from the charts that the external leaking noise is reduced by providing the sound insulating board 95A.

In order to reduce the external leaking noise as has been described above, it is sufficient to provide a sound insulating board in a region shown by reference numeral B in FIG. 5. However, in the present embodiment, the width of sound insulating plate 95A is equal to the width of the outer housing 42. This is from the following reason.

As shown in FIG. 6, the sound insulating board 95A has a curved shape. Accordingly, the cooling airflows discharged from the vents 63 to 65 of the inner housing 41 are directed to the power supply unit 72 and the lamp stabilizer 73 provided in the space 58 (solid arrows shown in FIG. 6).

Therefore, the sound insulating board 95A having a large width and an appropriate shape may serve as an air-conducting plate guiding the cooling airflows. Accordingly, the cooling airflows generated at the air intake fans 59 to 61 cools the liquid display panel units 54 to 56 and also cools other devices, units and substrates, e.g., the power supply unit 72 and the lamp stabilizer 73, installed within the space 58. Thus, the cooling process can be implemented in an efficient manner.

In the following, a projector 40B of a second embodiment of the present invention will be described.

Figure 7:
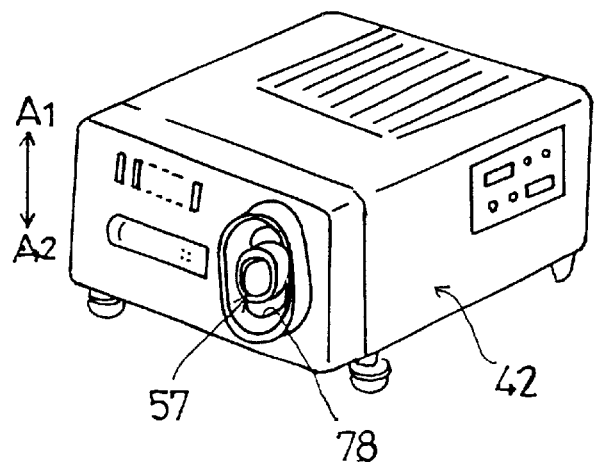
FIG. 7 is a perspective view showing the projector of the first embodiment of the present invention.
Figure 9:
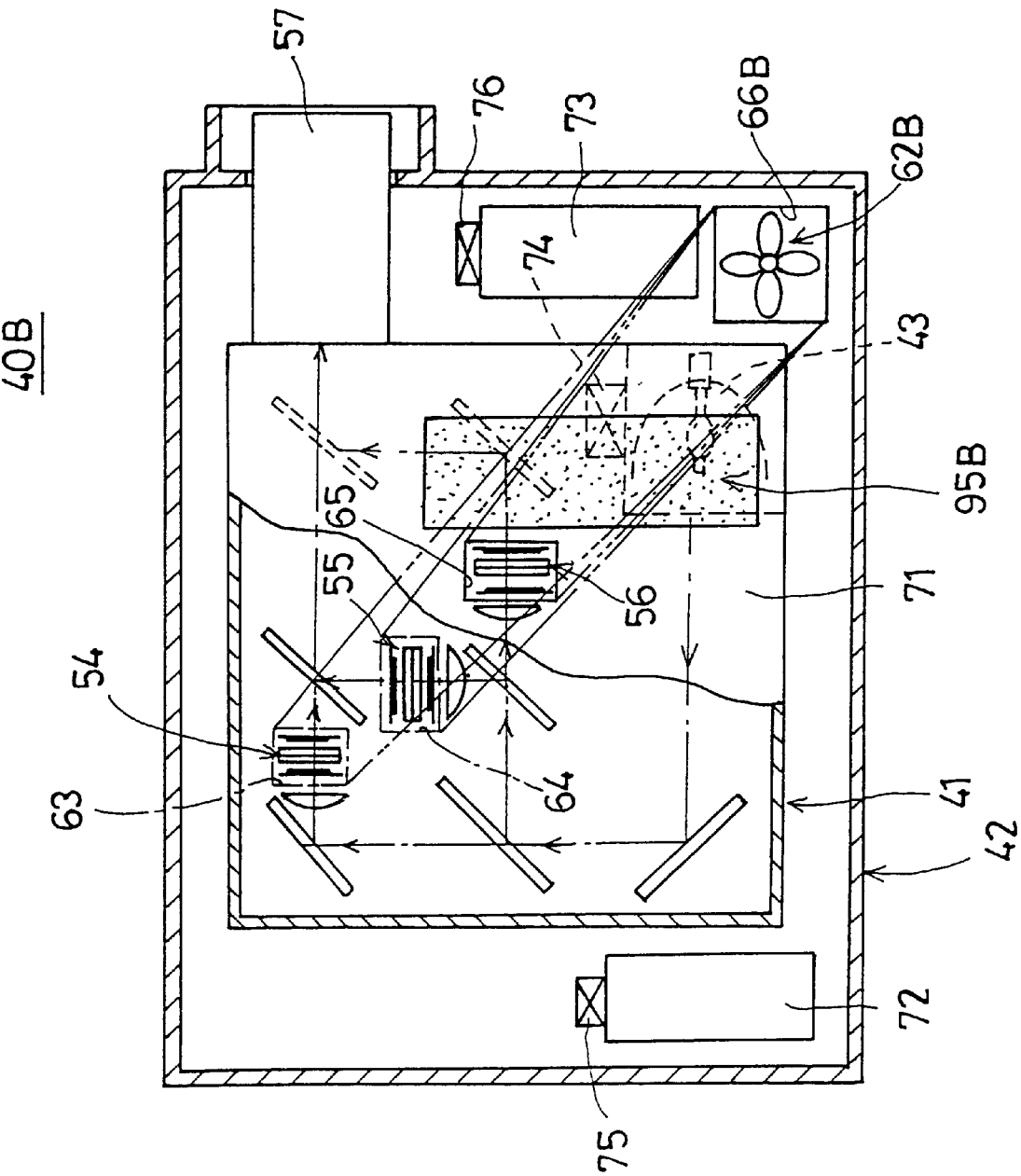
FIG. 9 is a diagram showing a transverse cross section of a projector of a second embodiment of the present invention.
Figure 10:
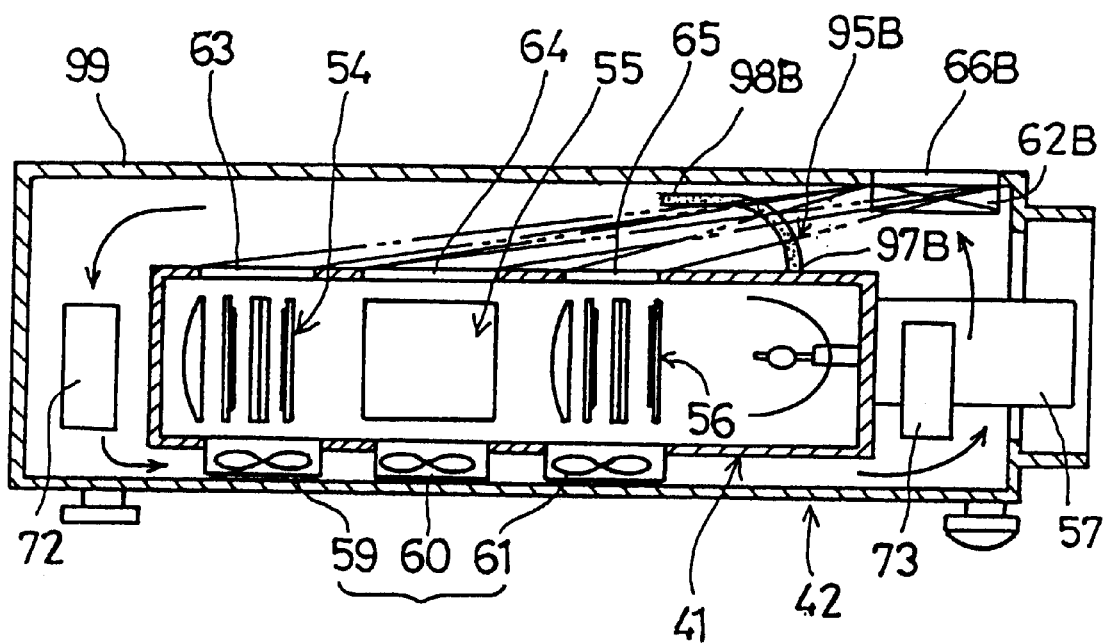
FIG. 10 is a diagram showing a vertical cross section of the projector of the second embodiment of the present invention.

FIGS. 9 and 10 are diagrams showing a projector 40B of a second embodiment of the present invention. Elements similar to those shown in FIGS. 5 to 7 are indicated by like reference numerals and are not described in detail.

The projector 40A of the first embodiment has a structure that the air discharge fan 62A and the external vents 66A are provided on the side surface of the outer housing 42. Whereas, the projector 40B of the present embodiment has a structure that the air discharge fan 62B and the external vents 66B are provided on a top plate 66B of the outer housing 42.

Normally, a user is present at the side of the projector. Therefore, the projector 40A of the first embodiment may be undesirable since the cooling airflow and the external leaking noise are discharged towards the user.

With the projector 40B of the second embodiment in which the air discharge fan 62B and the external vents 66B are provided on a top plate 66B of the outer housing 42, the cooling airflow and the external leaking noise will not be discharged towards the user. Thus, the usability of the projector is improved.

In the present embodiment, a sound insulating board 95B is provided in the first propagation paths (shown by a dash-dot-line in FIGS. 9 and 10) directly extending from the vents 63 to 65 to the external vent 66B. In detail, in the present embodiment, the sound insulating board 95A is provided so as to traverse straight lines extending from each of the vents 63 to 65 to the external vent 66B. For the sake of clarity, the sound insulating board 95B is shown as a dotted area.

Also, with the structure of the second embodiment, the noise will no longer travel along the first propagation path since it is reflected by the sound insulating board 95A. Accordingly, the external leaking noise of the projector 40B is reduced.

FIG. 11 is a diagram showing a chart of noise values generated in the projector having a structure similar to the projector 40B of a second embodiment of the present invention but without the sound insulating board 95B. In other words, the air discharge fan 62B and the external vents 66B are provided on a top plate 66B of the outer housing 42, but there is no sound insulating board. FIG. 12 is a diagram showing a chart of noise values generated in the projector 40B of a second embodiment of the present invention. The charts shown in FIGS. 11 and 12 are similar to the chart shown in FIG. 4 concerning the measured items and a method of measurement.

Now, the chart shown in FIG. 12 is compared to the chart of FIG. 11. Then, it can be seen that with the sound insulating board 95B, the noise value generated with three air-intake fans 59 to 61 was reduced from 40.6 dB to 39.0 dB. Accordingly, the noise value of the external leaking noise was also significantly reduced from 46.7 dB to 44.5 dB. Thus, the external leaking noise is also reduced with the structure of the present embodiment.

In the present embodiment, the sound insulating board 95B is only provided in the first propagation paths extending from each vent 63 to 65 to the external vent 66B. It is also to be noted that the lower edge 97B of the sound insulating board 95B is connected to the inner housing 41, but the upper edge 98B is spaced apart from the outer housing 42. Accordingly, the sound insulating board 95B may take any position or shape depending on the paths of the cooling airflows given that the above-described conditions are satisfied. (The condition is that the sound insulating board 95B is provided only in the first propagation paths extending from each vent 63 to 65 to the external vent 66B.)

In the above-described embodiments, the sound insulating boards 95A, 95B are provided so as to reflect the noise from the vents 63 to 65. However, the noise may be absorbed by sound-absorbing fabric provided on the sound insulating boards 95A, 95B.

In the following description, a dust-proof mechanism of the present invention will be described. Referring again to FIGS. 6 and 7, it can be seen that the projector 40A of the present embodiment may be configured such that the projecting lens 57 is movable with respect to the outer housing 42 through a predetermined vertical distance in directions shown by arrows A1 and A2. With such configuration, a position of projection can be easily adjusted against the position of the screen. Thus, the usability of the projector 40A is improved.

The outer housing 42 is provided with an elongated opening 78 extending in the A1-, A2-directions. The projecting lens 57 protrudes from the outer housing 42 through the elongated opening 78 and is movable in the vertical direction by means of a rocking mechanism (not shown). With this configuration, it is necessary to provide a dust-proof mechanism to prevent any dust from entering into the projector 40A through a gap between the elongated opening 78 and the projecting lens 57.

Figure 13:
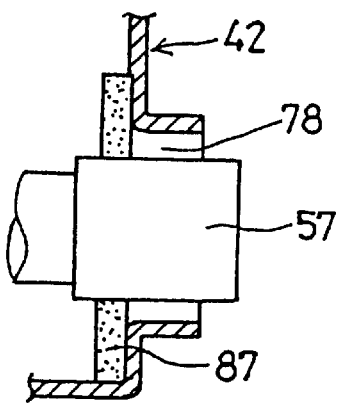
FIG. 13 is a cross-sectional diagram showing a dust-proof mechanism of a first example of the related art.

FIG. 13 is a cross-sectional diagram showing a dust-proof mechanism of a first example the related art. The dust-proof mechanism of FIG. 13 includes a sponge-like member 87 filling the gap between the elongated opening 78 and the projecting lens 57. However, such dust-proof mechanism has a drawback that the projecting lens 57 can only move through a small distance in a vertical direction.

Figure 14A:
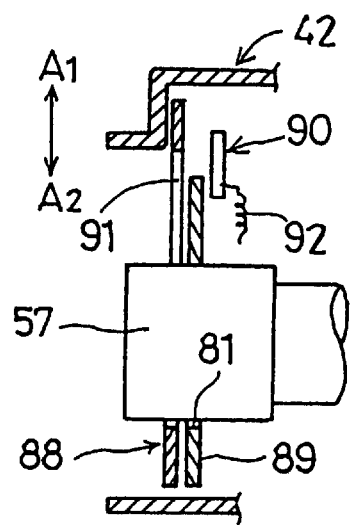
FIGS. 14A and 14B are a cross-sectional diagram and an exploded diagram, respectively, showing a dust-proof mechanism of a second example of the related art.
Figure 14B:
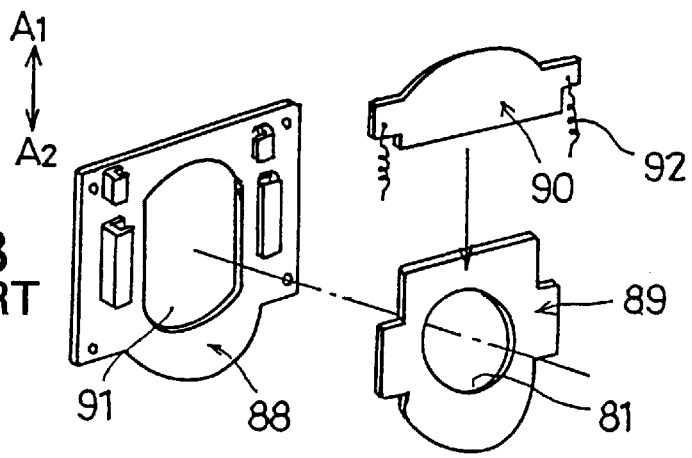

FIGS. 14A and 14B are a cross-sectional diagram and an exploded diagram, respectively, showing a dust-proof mechanism of a second example the related art. The dust-proof mechanism shown in FIGS. 14A and 14B includes a first plate-like member 89, a second plate-like member 90 and a third plate-like member 88. The first plate-like member 89 is a slidable member provided with a mounting hole 81 having a diameter slightly greater than the diameter of the projecting lens 57. The second plate-like member 90 is a slidable member pulled in one direction under a tension exerted by a spring 92. The third plate-like member 88 is provided with an elongated hole 91. The third plate-like member 88 is further provided with guide members for slide guiding the first and second plate-like members 89 and 90.

When the projecting lens 57 slides upwards (i.e., in the A1-direction), the first plate-like member 89 slides upwards with the projecting lens 57. Then, when the top part of the projecting lens 57 abuts the lower edge of the second plate-like member 90, the first and second plate-like members 89 and 90 will simultaneously slide upwards. Thus, the projecting lens 57 may be moved upwards until the first and second plate-like members 89 and 90 come in contact with the outer housing 42.

With the dust-proof mechanism shown in FIGS. 14A and 14B, the range of displacement of the projecting lens 57 is limited by the size of the outer housing 42.

Figure 15:
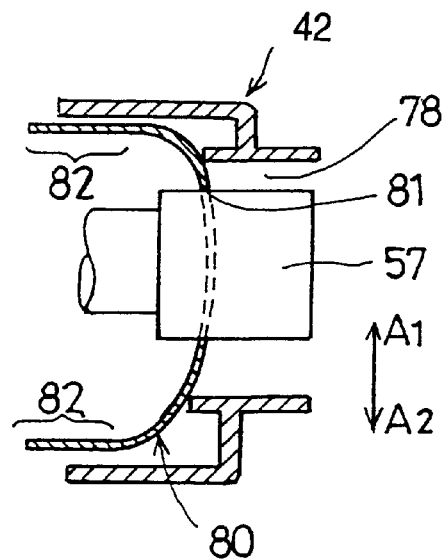
FIG. 15 is a cross-sectional diagram showing a dust-proof mechanism of a first embodiment which may be provided on the projector of the present invention.

Thus, there is a need to overcome the drawbacks of the dust-proof mechanisms shown in FIGS. 13 to 14C. FIG. 15 is a cross-sectional diagram showing a dust-proof mechanism 67 of a first embodiment which may be provided on the projector of the present invention. The dust-proof mechanism 67 includes a dust-proof member 80 provided on the projecting lens 57. The dust-proof member 80 fills the gap between the projecting lens 57 and the elongated opening 78.

The dust-proof member 80 is provided with a mounting hole 81 formed at the center thereof. The projecting lens 57 penetrates through the mounting hole 81. Thus, as the projecting lens 57 moves in the A1-, A2-directions, the dust-proof member 80 may also slide in the A1-, A2-directions.

The dust-proof member 80 is bent along the inner surface of the outer housing 42 in the direction of movement of the projecting lens 57. With such configuration, the dust-proof member 80 can be prevented from abutting the outer housing 42. Thus, the dust-proof member 80, or the projecting lens 57, may be moved through a greater distance.

Further, in the present embodiment, the dust-proof member 80 is provided with flexible parts 82 on both ends thereof. The flexible parts 82 may be made of an easily deformable film-like member.

Thus, the flexible parts 82 on both ends of the dust-proof member 80 allow the movement of the projecting lens 57 even if the dust-proof member 80 comes into contact with the inner surface of the outer housing 42. Thus, the projecting lens 57 may be moved through a comparatively greater distance in the outer housing 42 having a smaller size or smaller height. Accordingly, a small sized projector 40A can be achieved.

Figures 16A, 16B, 16C:
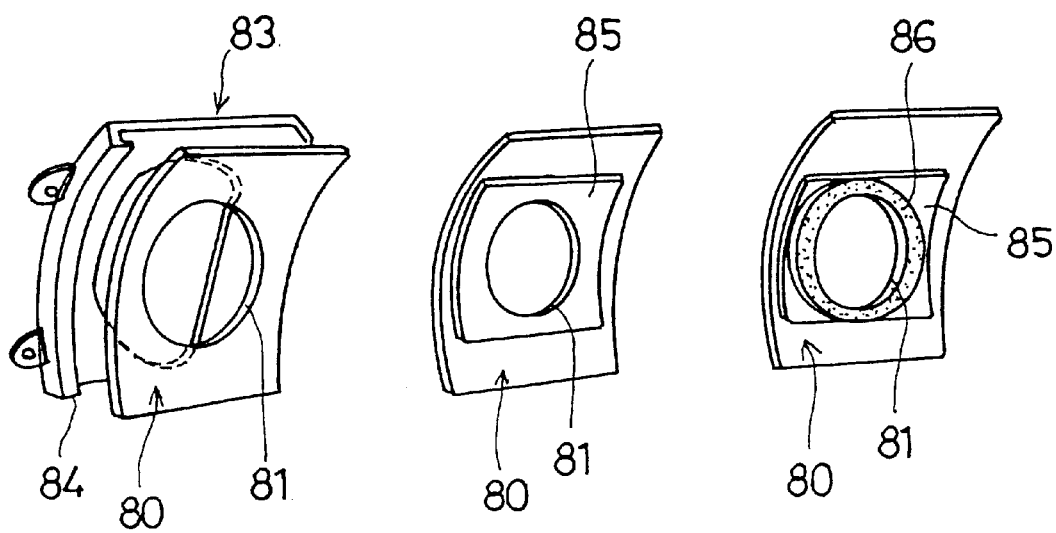
FIGS. 16A to 16C are perspective diagrams showing variants of the dust-proof mechanism shown in FIG. 15.

FIGS. 16A to 16C are perspective diagrams showing variants of the dust-proof mechanism 67 shown in FIG. 15.

A dust-proof mechanism shown in FIG. 16A includes a guide member 84 which is provided on the outer housing 42. The guide member 84 is provided with rail parts 83 for guiding the dust-proof member 80. With this configuration, the sliding operation of the dust-proof member 80 may be implemented in a smooth and secure manner. The present variant is particularly advantageous when the deformable parts 82 are provided over a large area.

A dust-proof mechanism shown in FIG. 16B includes a reinforcement member 86 provided adjacent the mounting hole 81 through which the projecting lens 57 is penetrated. When the projecting lens 57 is moved, a comparatively strong force is exerted on the mounting hole 81. The reinforcement member 85 is provided for preventing a degradation of the mounting hole 81 of the dust-proof member 80 that occurs with time. If any degradation such as a crack is produced at the mounting hole 81, dust will enter the projector from this degraded part.

Since the reinforcement member 85 adjacent the mounting hole 81 can prevent degradation from occurring with time at the mounting hole 81, it is possible to positively prevent dust from entering the projector.

A dust-proof mechanism shown in FIG. 16C is similar to the dust-proof mechanism shown in FIG. 16B, but is further provided with an elastic member 86 provided adjacent the mounting hole 81. The elastic member 86 is ring-like and surrounds the mounting hole 81.

The projecting lens 57 is configured so as to be in close contact with the elastic member 86. Since the gap between the projecting lens 57 and the mounting hole 81 is obstructed by the elastic member 86, it is possible to positively prevented dust from entering the projector.

Further, the present invention is not limited to these embodiments, but variations and modifications may be made without departing from the scope of the present invention.

The present application is based on Japanese priority application No. 11-262005 filed on Sep. 16, 1999, the entire contents of which are hereby incorporated by reference.

What is claimed is:

1. A projector comprising:
    a first housing provided with first heat-generating elements used for generating an image, first fans producing cooling airflows towards each one of said first heat-generating elements and vents via which the cooling airflows heated by said first heat-generating elements are discharged;
    a second housing in which said first housing is installed, said second housing being provided with second fans discharging said cooling airflows outside the projector; and
    a sound insulating member provided on a path between said vents and said second fans so as to insulate sound produced by said first fans.

2. The projector as claimed in claim 1, further comprising second heat-generating elements provided in a space formed between said first housing and said second housing,
    wherein said sound insulating member is configured as a plate-like member which may be deformed in a curved shape such that said cooling airflows are directed towards said second heat-generating elements.

3. A projector comprising:
    a housing provided with an elongated opening extending in a vertical direction with respect to an optical axis;
    a projecting lens movable within said opening in a vertical direction with respect to the optical axis such that a position of a projected image is movable; and
    a dust-proof member obstructing a gap formed between said projecting lens and said opening, said dust-proof member being slidable within said housing in connection with a movement of said projecting lens, said dust-proof member being bent along the inner surface of the housing in a direction of movement of the projecting lens.

4. The projector as claimed in claim 3, wherein predetermined regions of said dust-proof member near both end parts in directions of sliding of said dust-proof member are flexible.

5. A projector having a light source emitting light beams, a color separation part separating the emitted light beams, a color composition part superimposing image signals onto the separated light beams, and a projecting lens via which the color composited light is projected, said projector comprising:

a first housing provided with first heat-generating elements used for generating an image, first fans producing cooling airflows towards each one of said first heat-generating elements and vents via which the cooling airflows heated by said first heat-generating elements are discharged;

a second housing in which said first housing is installed, said second housing being provided with second fans discharging said cooling airflows outside the projector; and a sound insulating member provided on a path between said vents and said second fans so as to insulate sound produced by said first fans.

6. The projector as claimed in claim 5, further comprising second heat-generating elements provided in a space formed between said first housing and said second housing, wherein said sound insulating member is configured as a plate-like member which may be deformed in a curved shape such that said cooling airflows are directed towards said second heat-generating elements.

7. A projector having a light source emitting light beams, a color separation part separating the emitted light beams, a color composition part superimposing image signals onto the separated light beams, and a projecting lens via which the color composited light is projected, said projector comprising:

a housing provided with an elongated opening extending in a vertical direction with respect to an optical axis;

a projecting lens movable within said opening in a vertical direction with respect to the optical axis such that a position of a projected image is movable; and a dust-proof member obstructing a gap formed between said projecting lens and said opening, said dust-proof member being slidable within said housing in connection with a movement of said projecting lens, said dust-proof member being bent along the inner surface of the housing in a direction of movement of the projecting lens.

8. The projector as claimed in claim 7, wherein predetermined regions of said dust-proof member near both end parts in directions of sliding of said dust-proof member are flexible.

\* \* \* \* \*